United States Patent Office 3,386,978
Patented June 4, 1968

3,386,978
PREPARATION OF HYDROLYZED ETHYLENE/
VINYL ACETATE COPOLYMER
Ival O. Salyer, Dayton, Ohio, assignor to Monsanto
Research Corporation, St. Louis, Mo., a corporation
of Delaware
No Drawing. Filed Mar. 30, 1964, Ser. No. 355,928
16 Claims. (Cl. 260—87.3)

ABSTRACT OF THE DISCLOSURE

Ethylene/vinyl acetate copolymer is hydrolyzed in presence of a water-soluble, inorganic hydrolyzing agent and in an inert, liquid solvent for the copolymer consisting essentially of a liquid, aromatic hydrocarbon, methanol and ethanol. A preferred embodiment comprises recovering the hydrolyzed copolymer from the hydrolysis reaction mixture by gradually adding the mixture to steaming hot or boiling water while withdrawing volatilized material by distillation, whereby the hydrolyzed copolymer is precipitated by the water and the solvent is removed in the distillate.

---

This invention relates to preparation of hydrolyzed ethylene/vinyl acetate copolymers and more particularly provides a new and valuable method of conducting the hydrolysis and recovering the hydrolyzed copolymer and solvents from the hydrolysis reaction mixtures.

Hydrolysis of ethylene/vinyl acetate copolymers to give products in which a part or all of the acetate groups of the copolymer have been converted to hydroxy radicals is generally effected by treating a solution of the copolymer with a suitable hydrolyzing agent such as alkali or mineral acid. For example, as taught in the Roland Patent No. 2,386,347, ethylene/vinyl ester copolymers are hydrolyzed to an extent of at least 80%, and preferably 95%, by treatment with alkali. In the Bryant Patent No. 2,668,809, hydrolysis of olefin/vinyl acetate copolymer is conducted by heating with sodium methoxide. In the Plambeck Patent No. 2,467,774, ethylene/vinyl acetate copolymer is hydrolyzed by heating at 80–85° C. in an aqueous methanolic solution containing sodium hydroxide in a quantity calculated to react with the number of ester groups it is desired to hydrolyze, and the hydrolyzed product is precipitated by the slow addition of enough salt to saturate the solution. In the Loder Patent No. 2,451,963, a benzene solution of ethylene/vinyl acetate copolymer is treated with a methanol solution of sodium hydroxide at about 30° C. for 4 hours to give a hydrolyzed product. In the Sharkey Patent No. 2,396,210, a 1.7:1.0 molar ratio ethylene/vinyl acetate copolymer in a mixture consisting of toluene and ethanol was boiled for 5 hours with potassium hydroxide to give a completely hydrolyzed copolymer. According to the Roland Patent No. 2,399,653, it is difficult to obtain partial hydrolysis products when using a primary alkanol as solvent; hydrolysis can be effectively controlled and partial hydrolysis products readily obtained by using a secondary alcohol of from 3 to 6 carbon atoms.

Hydrolyzed ethylene-vinyl acetate copolymer is of significant commercial interest because, unlike polyvinyl alcohol, it is water-insoluble, and can be melt spun. At the same time, said hydrolyzed copolymer possesses the important, advantageous properties of polyvinyl alcohol, such as strength, toughness, elasticity, and resistance to organic solvents. Hence numerous processes have been devised for preparing the products, with particular attention being given to methods of controlling the hydrolysis to obtain conversion of only a part of the ester groups, since retention of some acetate radicals in the hydrolyzed material contributes to very good strength and solvent-resistance characteristics. In industrial practice, the hydrolysis is generally conducted in a material which is a solvent for the unhydrolyzed copolymer, for example, an aromatic hydrocarbon such as toluene, and the hydrolysis product is then precipitated from a non-solvent, for example, methanol. The aromatic hydrocarbon present in the hydrolysis reaction mixture should be recoverable in order to make for economic operation. When the hydrolyzed copolymer is recovered by precipitation from an alkanol, the filtrate contains too much alkanol to be useful for recycling as solvent (since the filtrate is a precipitant), and the hydrocarbon content thereof cannot be concentrated without much repeated distillation. Moreover, precipitation by alkanol does not serve to separate the inorganic material present, so that extensive water-washing of finely comminuted hydrolyzed copolymer is usually required to obtain a useful product.

An object of this invention is the provision of an improved process for hydrolyzing ethylene/vinyl acetate copolymer.

Another object of this invention is to provide an improved process of recovering hydrolyzed ethylene/vinyl acetate copolymer from hydrolysis reaction mixtures.

A further object is the provision of a method for the recovery of solvent used in the hydrolysis of ethylene/vinyl acetate copolymer.

These and other objects hereinafter defined are provided by the invention, wherein a reaction mixture, obtained by hydrolysis of ethylene/vinyl acetate copolymer in the presence of a water-soluble, inorganic hydrolyzing agent and in an inert, liquid solvent for the copolymer consisting essentially of a mixture of a liquid, aromatic hydrocarbon and lower alkanol, is gradually added to steaming hot water while withdrawing volatilized material by distillation, whereby hydrolyzed copolymer is precipitated by the water and solvent is removed in the distillate.

The aromatic hydrocarbon component may be any liquid, aromatic hydrocarbon which is inert during the reaction conditions, for example, benzene, toluene, xylene, butylbenzene, ethylbenzene, isopropylbenzene, etc. It may or may not be one which boils below or at the boiling point of water or which forms an azeotrope with water, since addition of the hydrolysis reaction mixture to the steaming hot water while withdrawing volatilized material is effective in removing the hydrocarbon in the distillate. Toluene is preferred. Removal of the volatiles by distillation gives a condensate which stratifies into an aqueous and a non-aqueous phase. The non-aqueous material is a solvent for ethylene-vinyl acetate copolymer and can be recycled to the hydrolysis step. The aqueous phase, containing a predominance of alkanol, may be used for introducing the inorganic hydrolyzing agent into the polymer solution.

The alkanol component may be any of the lower saturated paraffinic alcohols, i.e., an alkanol of from, say, 1 to 6 carbon atoms. Methanol, ethanol, or isopropanol, being the more available and possessing the greater affinity for most inorganic hydrolyzing agents, are more commonly employed. In the present process, addition of the solvent mixture to steaming hot water generally results in the formation of volatiles containing a preponderance of the aromatic hydrocarbon, irrespective of the nature of the alkanol.

A significant aspect of this invention is that catalytic hydrolysis of ethylene/vinyl acetate copolymer can be readily controlled when operating in a media comprising an inert, liquid aromatic hydrocarbon and a mixture of ethanol and methanol, rather than a single alkanol. The liquid aromatic hydrocarbon/ethanol/methanol system has the following advantages over prior art practice. Use of ethanol with the liquid aromatic hydrocarbon does not present the discoloration problem, and ethanol has good miscibility with such common aromatic hydrocarbon solvents as benzene and toluene, but the mixtures are poor solvents for the alkali metal hydroxides. For example, mixtures of toluene and ethanol containing as much as 0.25 N KOH are not stable; apparently, the potassium hydroxide precipitates out progressively with time. Methanol, alone, generally will form stable solutions of the alkali metal hydroxides, even at 1.0 N or above, and such solutions do not discolor. However, methanolic alkali hydroxides, e.g., potassium hydroxide, has limited miscibility with toluene and even less with benzene. Hence when the methanolic potassium hydroxide is added to a solution of the polymer which is to be hydrolyzed, the polymer precipitates out before it is hydrolyzed. Use of a secondary alcohol, either alone or with an aromatic hydrocarbon (see the Roland Patent No. 2,399,653) results in the production of colored products because the secondary alcohol, e.g., the generally used isopropanol, yellows and darkens extensively when potassium hydroxide or sodium hydroxide is added to it. Thus, in the case of isopropanol, there is probably oxidation to ketone and condensation of the latter to give mesityl oxide. The odor of mesityl oxide is distinctly noted in hydrolysis solutions prepared with isopropanol, and such solutions turn orange-colored almost immediately after adding the base, the depth of color increasing with time and temperature.

The foregoing disadvantages are not encountered when employing a mixture of the liquid aromatic hydrocarbon, methanol and ethanol. Advantageously the polymer which is to be hydrolyzed is dissolved in the liquid aromatic hydrocarbon solvent, and to this solution of polymer there is added a hydrolyzing solution consisting essentially of the inorganic hydrolyzing agent, e.g., an alkali metal hydroxide in a mixture of ethanol and methanol, which mixture is advantageously in substantially a 1:1 volume ratio of ethanol to methanol. There should be enough aromatic hydrocarbon present in the reaction mixture to avoid precipitation of the copolymer, either before or after hydrolysis. Hence, in order to assure an adequate content of aromatic solvent in the reaction mixture, the aromatic hydrocarbon may be added with the alkanol to the solution of copolymer that is to be hydrolyzed. The aromatic hydrocarbon content of the hydrolyzing solution may be widely varied, of course, so long as the resulting reaction mixture contains enough hydrocarbon to dissolve both the unhydrolyzed and hydrolyzed copolymer. For easy, practical operation, a mixture of toluene, methanol and ethanol of 1:1:1 by volume is advantageously used with the hydrolyzing agent or catalyst that is added to the solution of the copolymer which is to be hydrolyzed. However, it is recommended that for initial runs the optimum hydrocarbon to alkanol ratio be arrived at by observation of the hydrolysis mixture as the reaction proceeds, with additional hydrocarbon being produced whenever there is indication of precipitation. Adjusting the proportion of hydrocarbon to alkanol involves only routine experimentation by those skilled in the art.

The nature of the inorganic hydrolyzing agent or catalyst may vary widely, as will be apparent to those skilled in the art, since a great number of materials are known which act to hydrolyze ester groups, either by saponification or catalysis. There may be used, for example, the alkali metal hydroxides or the oxides or alkaline salts thereof such as a potassium sodium or lithium oxide, hydroxide or carbonate, the alkoxides such as sodium or potassium methoxide or isopropoxide, etc. Useful acidic materials include the mineral acids such as hydrochloric or sulfuric acid, water-soluble acidic salts such as aluminum or ferric chloride, etc. The proportion of the hydrolyzing agent will depend upon the method to be used, i.e. whether a saponification or a catalytic hydrolysis is desired. Hence, it can vary from the stoichiometric amount (or in excess thereto) required for saponification of the desired number of acetate groups and down to the very small amounts required for catalytic hydrolysis, which amounts are generally of the order of from, say, .01% to 2.0% by weight of the copolymer, and preferably of from about 0.1% to 1.0%. As will also be apparent, intermediate quantities of the alkali or acid may be employed, whereby some of the acetate groups are hydrolyzed by one mechanism and others by another. Because the prior art catalytic hydrolysis of ethylene/vinyl acetate copolymer was hard to control, the catalytic process was generally used only for the preparation of the completely hydrolyzed copolymer. Otherwise, uniformity of product from one batch to another could not be attained. Surprisingly, I have found that use of a mixture of ethanol and methanol with an aromatic hydrocarbon as the reaction media permits controlled, partial hydrolysis, even though the catalytic method is used.

For easy recovery of the hydrolyzed copolymer and solvent by gradual or dropwise addition to water, hydrolysis reaction mixture obtained by the catalytic process are preferred. Employing the catalytic method, and using water-soluble inorganic materials as the hydrolyzing catalysts, the very small quantities of catalyst present are readily removed by the presently provided process upon contact of the crude hydrolysis reaction mixture with the hot water. The catalyst dissolves in the water, while the hydrolyzed copolymer precipitates and the solvent distills off. It will be appreciated by those skilled in the art, of course, that the less impurity from which the hydrolyzed copolymer must be freed, the more desirable the process by which the copolymer has been prepared.

To recapitulate: Broadly, the invention provides an improved method for the simultaneous recovery of copolymer and of solvent from reaction mixtures obtained by treating ethylene/vinyl acetate copolymer with a water-soluble inorganic hydrolyzing agent in a solvent which is a mixture of an inert liquid aromatic hydrocarbon and a lower alkanol which comprises gradually adding the reaction mixture to steaming water while withdrawing volatilized material from the reaction zone. By hydrolyzing agent is meant a material which acts either catalytically or by saponification. It may be acidic or basic. The hydrolysis may be partial or complete. By steaming hot water is meant water which, owing to temperature and pressure, is substantially continuously giving off vaporized water. It may or may not be boiling, although maintenance of the water at its boiling point, results in optimum recovery of solvent. The solvent employed in the hydrolysis may be a mixture of said aromatic hydrocarbon and alkanol in any proportion. An important embodiment of the invention is the use of a mixture of methanol and ethanol, particularly when control of partial hydrolysis is desired.

The invention is further illustrated by, but not limited to, the following examples:

EXAMPLE 1

To a solution of about 300 grams of an ethylene/vinyl acetate copolymer analyzing 62.7% vinyl acetate in about 700 ml. of toluene which had been heated to effect thorough solution and volatilize any monomer, was first added 500 ml. of a 1:1:1 volume ratio mixture of toluene, methanol and ethanol, and then 2 ml. of an 0.5 N aqueous potassium hydroxide solution. The whole was stirred at about 93° C. for 1 hour, at the end of which time the vinyl acetate content of the polymer was found to be 60.6%. Stirring and heating of the solution was continued for a total reaction time of 5 hours, with additional 2 ml. portions of the aqueous potassium hydroxide being added at the end of 2 hours and again at the end of 4 hours, and 50 ml. samples being taken at one hour intervals to study the course of hydrolysis, with replacement by 50 ml. portions of fresh 1:1 volume ratio ethanol/methanol mixtures.

Precipitation was effected by dropwise addition of 500 ml. of the above reaction mixture to 2000 ml. of boiling water in a flask which was equipped with a condenser. The distillate thus obtained comprised toluene, and the solvent property of the distillate was determined by adding 30 grams of the original, unhydrolyzed copolymer to 100 ml. of toluene. All of the copolymer was dissolved. The polymer which was precipitated from the boiling water was filtered off, water washed and dried. It was found to have a vinyl acetate content of 41.2%.

EXAMPLE 2

To a solution of 1434 grams of ethylene/vinyl acetate copolymer analyzing 54.6% vinyl acetate in 3346 ml. of toluene at room temperature there was added, in seven portions at spaced intervals over a period of about 16 days, a total of 296.1 ml. of a .5 N KOH solution dissolved in 2400 ml. of a solvent which had been prepared by mixing together toluene, ethanol and methanol in a 1:1:1 volume ratio. At the end of this time, a sample of hydrolysis mixture showed that the vinyl acetate content of the copolymer was 36.0%.

The reaction mixture was then added dropwise to one liter of boiling water contained in a 2-liter; 4-neck flask which was fitted with dropping funnels, stirrer, and a Vigreaux column connected to a distilling head, and a condenser. The hydrolysis reaction mixture was dropped through the funnel and precipitated on contact with the boiling water. Being lighter than water, the precipitated polymer floated on the surface. Over a period of 3 hours, 550 ml. of the hydrolysis reaction mixture was thus precipitated. Simultaneously the distillate was collected into a separatory funnel. Later, the distillate divided into water-soluble and water-insoluble components. The water-insoluble solvent was recycled to the hydrolysis process where it was used to dissolve more unhydrolyzed ethylene/vinyl acetate copolymer.

EXAMPLE 3

This example shows that even when the ratio of hydrocarbon to alkanol is widely varied in hydrolysis of a 55:45 weight ratio ethylene/vinyl acetate copolymer, substantially the same degrees of hydrolysis are obtained when the alkanol content is a mixture of the methanol and ethanol. In each of four runs, to a 100 ml. sample of a 20% solution of the copolymer in toluene there was added 2 ml. of 0.5 N aqueous potassium hydroxide and 0.5 ml. of water in 40 ml. of a hydrolysis solution consisting of toluene, methanol and ethanol in the volume ratios shown below, and the resulting reaction mixtures were stirred for 24 hours at room temperature. At the end of that time the reaction mixtures were respectively precipitated, and the precipitated copolymer was filtered off, washed and dried, and the vinyl acetate content of each copolymer was determined. The following results were obtained:

| Run No. | Hydrolysis, Toluene | Solution, Ethanol | Molar ratio, Methanol | Vinyl acetate, wt. percent |
|---|---|---|---|---|
| (1) | 1 | 2 | 2 | 37.0 |
| (2) | 0 | 1 | 1 | 36.9 |
| (3) | 2 | 1 | 1 | 36.9 |
| (4) | 0 | 2 | 1 | 36.6 |

It will be realized, of course, that even though the hydrolysis solution contained no toluene, the latter was present in the hydrolysis reaction mixture, since in each case the hydrolysis solution was added to a toluene solution of the same unhydrolyzed copolymer. Thus, in run 2, wherein the hydrolyzing solution contained no toluene, there was present in the hydrolysis reaction mixture the approximately 100 ml. toluene of the unhydrolyzed sample plus 20 ml. of ethanol which made up the 40 ml. total of the hydrolysis solution.

As many widely different embodiments of this invention may be made without departing from the spirit and scope thereof, it is to be understood that this invention is not limited to the specific embodiments thereof except as defined in the appended claims.

What I claim is:
1. The method which comprises gradually adding a reaction mixture, obtained by hydrolysis of ethylene/vinyl acetate copolymer in presence of a water-soluble inorganic hydrolyzing agent and in an inert, liquid solvent for the copolymer consisting essentially of a mixture of a liquid, aromatic hydrocarbon, and methanol and ethanol to steaming hot water while withdrawing volatilized material by distillation, whereby hydrolyzed ethylene/vinyl acetate copolymer is precipitated by the water and solvent is removed in the distillate.

2. The method defined in claim 1, further limited in that the inorganic hydrolyzing agent is an alkali metal hydroxide.

3. The method defined in claim 1, further limited in that the hydrocarbon is toluene.

4. The method which comprises adding dropwise a reaction mixture, obtained by hydrolysis of ethylene/vinyl acetate copolymer in presence of an inorganic, water-soluble catalyst of hydrolysis and in an inert, liquid solvent for the copolymer consisting essentially of a mixture of a liquid aromatic hydrocarbon, and methanol and ethanol to boiling water while withdrawing volatilized material by distillation, whereby hydrolyzed ethylene/vinyl acetate copolymer is precipitated by the water and the solvent is removed in the distillate.

5. The method defined in claim 4, further limited in that the catalyst is an alkali metal hydroxide.

6. The method defined in claim 4, further limited in that the hydrocarbon is toluene.

7. The method which comprises dissolving ethylene/vinyl acetate copolymer in toluene, treating the resulting solution with a catalytic quantity of alkali metal hydroxide in a solvent consisting essentially of a mixture of ethanol and methanol, to obtain a reaction mixture containing at least partially hydrolyzed copolymer, and adding said reaction mixture dropwise to boiling water to precipitate the hydrolyzed copolymer and to remove solvent by distillation.

8. The method defined in claim 7, further limited in that the alkali hydroxide is potassium hydroxide.

9. The method which comprises dissolving ethylene/vinyl acetate copolymer in toluene, treating the resulting solution with a catalytic quantity of alkali metal hydroxide in a solvent consisting essentially of toluene, ethanol and methanol to obtain a reaction mixture containing hydrolyzed ethylene/vinyl acetate copolymer, and adding said reaction mixture dropwise to boiling water to precipitate the hydrolyzed copolymer and to remove solvent by distillation.

10. The method defined in claim 9, further limited in that the alkali hydroxide is potassium hydroxide.

11. The method of hydrolyzing ethylene/vinyl acetate copolymer, which comprises stirring the copolymer with a water-soluble inorganic catalyst of hydrolysis in a solvent consisting essentially of an inert, liquid aromatic hydrocarbon, ethanol and methanol.

12. The method defined in claim 11, further characterized in that the catalyst is an alkali metal hydroxide.

13. The method defined in claim 11, further characterized in that the aromatic hydrocarbon is toluene.

14. The method of hydrolyzing ethylene/vinyl acetate copolymer, which comprises stirring the copolymer with a catalytic quantity of potassium hydroxide in a solvent consisting essentially of a mixture of toluene, ethanol and methanol.

15. The method defined in claim 14, further limited in that the toluene, ethanol and methanol are present in substantially equal proportions by volume.

16. The method of hydrolyzing ethylene/vinyl acetate copolymer, which comprises stirring the copolymer with a catalytic quantity of potassium hydroxide in a solvent consisting essentially of a mixture of benzene, ethanol and methanol.

References Cited

UNITED STATES PATENTS

| | | | |
|---|---|---|---|
| 2,386,347 | 10/1945 | Roland | 260—87.3 |
| 2,403,464 | 7/1946 | Smith | 260—87.3 |
| 2,434,179 | 1/1948 | Sharkey | 260—87.3 |

JOSEPH L. SCHOFER, *Primary Examiner.*

M. B. KURTZMAN, *Assistant Examiner.*